US012603568B2

(12) United States Patent
Chin et al.

(10) Patent No.: US 12,603,568 B2
(45) Date of Patent: Apr. 14, 2026

(54) POWER MODULE, TOTEM-POLE POWER FACTOR CORRECTION CIRCUIT, AND CONTROL CIRCUIT THEREOF

(71) Applicant: Huawei Digital Power Technologies Co., Ltd., Shenzhen (CN)

(72) Inventors: Ken Chin, Shenzhen (CN); Shuaibing Wang, Dongguan (CN); Bo Wang, Shenzhen (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 278 days.

(21) Appl. No.: 18/455,913

(22) Filed: Aug. 25, 2023

(65) Prior Publication Data

US 2024/0072650 A1     Feb. 29, 2024

(30) Foreign Application Priority Data

Aug. 26, 2022     (CN) ......................... 202211032188.9

(51) Int. Cl.
H02M 1/42 (2007.01)
H02M 1/00 (2006.01)
H02M 3/158 (2006.01)

(52) U.S. Cl.
CPC ....... H02M 1/4233 (2013.01); H02M 1/0085 (2021.05); H02M 3/158 (2013.01)

(58) Field of Classification Search
CPC .. H02M 1/4233; H02M 1/425; H02M 1/4258; H02M 1/4266; H02M 1/4275; H02M 1/42; H02M 1/4208; H02M 1/4216; H02M 1/4225; H02M 3/158; H02M 3/157; H02M 3/1566; H02M 3/1586
See application file for complete search history.

(56) References Cited

U.S. PATENT DOCUMENTS

2001/0026460 A1* 10/2001 Ito ....................... H02M 5/4585
                                                              363/34
2019/0326810 A1   10/2019 Hashimoto et al.

FOREIGN PATENT DOCUMENTS

| | | | |
|---|---|---|---|
| CN | 105004910 | A | 10/2015 |
| CN | 105874694 | B | 4/2019 |
| CN | 109713918 | A | 5/2019 |
| CN | 113383489 | A | 9/2021 |
| WO | 2022017330 | A1 | 1/2022 |

OTHER PUBLICATIONS

Park et al.,"ZVS Interleaved Totem-Pole Bridgeless PFC Converter with Phase-Shifting Control", The 2018 International Power Electronics Conference, IEEJ, 2018, (IPEC-Niigata 2018 -ECCE Asia), May 2018, doi:10.23919/IPEC.2018.8507373, 5 pages.

* cited by examiner

*Primary Examiner* — Nguyen Tran
(74) *Attorney, Agent, or Firm* — Maier & Maier, PLLC

(57) ABSTRACT

A power module, a totem-pole power factor correction circuit, and a control circuit thereof. In response to a case in which a phase value of a transient voltage of an input voltage of the totem-pole power factor correction circuit is within a predetermined phase range, and an absolute value of a voltage value is less than a predetermined voltage value, the control circuit controls a main power switch in the totem-pole power factor correction circuit to be turned on and off, and controls an auxiliary power switch to remain off.

4 Claims, 7 Drawing Sheets

POWER MODULE, TOTEM-POLE POWER FACTOR CORRECTION CIRCUIT, AND CONTROL CIRCUIT THEREOF

CROSS-REFERENCE TO RELATED APPLICATIONS

This application claims priority to Chinese Patent Application No. 202211032188.9, filed on Aug. 26, 2022, which is hereby incorporated by reference in its entirety.

TECHNICAL FIELD

The embodiments relate to the field of power supply technologies and to a power module, a totem-pole power factor correction circuit, and a control circuit thereof.

BACKGROUND

A power module includes a totem-pole power factor correction circuit, a direct current conversion circuit, and a control circuit. The totem-pole power factor correction circuit is configured to receive an alternating current, and provide an input voltage for the direct current conversion circuit. The totem-pole power factor correction circuit includes at least one switching transistor and at least one inductor. The control circuit is configured to control turn-on and turn-off of the at least one switching transistor, to alternately charge and discharge the inductor. When alternately charged and discharged, the inductor may be configured to rectify the alternating current, and provide the input voltage for the direct current conversion circuit. When the control circuit adjusts charging time and discharging time of the inductor to change, a power factor provided by the power factor correction circuit can be adjusted, to improve power consumption efficiency of the power module. When a peak voltage value of the input voltage of the totem-pole power factor correction circuit is small, energy stored after the inductor is charged is low, and a voltage provided by the inductor for the switching transistor is low. In this case, if the control circuit controls the switching transistor to be turned on, hard turn-on of the switching transistor in a case of different voltages at both sides may be caused, which increases a switching loss of the power factor correction circuit.

Therefore, how to avoid hard turn-on of the switching transistor in the totem-pole power factor correction circuit is a technical problem that needs to be resolved in this field.

SUMMARY

The embodiments provide a power module, a totem-pole power factor correction circuit, and a control circuit thereof.

A first aspect of the embodiments provides a totem-pole power factor correction circuit, including a control circuit and a half-bridge circuit. The half-bridge circuit includes a main power switch and an auxiliary power switch. The totem-pole power factor correction circuit is configured to receive an input voltage, and provide an output voltage. The control circuit is configured to output a control signal to the half-bridge circuit. In response to a case in which a phase value of the input voltage is within a predetermined phase range, and an absolute value of a voltage value of the input voltage is less than a predetermined voltage value, the main power switch is turned on and off based on the control signal, and the auxiliary power switch remains off based on the control signal. Therefore, when a phase value of a transient voltage of the input voltage of the totem-pole power factor correction circuit is within the predetermined phase range, and the absolute value of the voltage value is less than the predetermined voltage value, the main power switch in the half-bridge circuit is turned on and off, and the auxiliary power switch is controlled to remain off. In this way, turn-on of the auxiliary power switch in a case of different voltages at both sides of the auxiliary power switch is avoided when the transient voltage of the input voltage is low. Therefore, a switching loss of the auxiliary power switch in the totem-pole power factor correction circuit is reduced, and operating efficiency of the totem-pole power factor correction circuit and a power module including the totem-pole power factor correction circuit is improved.

In an embodiment of the first aspect, when the phase value of the input voltage is not within the predetermined phase range, the main power switch and the auxiliary power switch are alternately turned on and off based on the control signal. Therefore, when the phase value of the transient voltage of the input voltage of the totem-pole power factor correction circuit is not within the predetermined phase range, the main power switch and the auxiliary power switch in the half-bridge circuit are alternately turned on and off. For example, when the phase value of the input voltage is not within the predetermined phase range, alternate turn-on of the auxiliary power switch and the main power switch can ensure bootstrap charging of the main power switch, thereby ensuring normal operation of the totem-pole power factor correction circuit.

In an embodiment of the first aspect, when the absolute value of the voltage value of the input voltage is greater than or equal to the predetermined voltage value, the main power switch and the auxiliary power switch are alternately turned on and off based on the control signal. Therefore, normal operation of the totem-pole power factor correction circuit is ensured.

In an embodiment of the first aspect, the predetermined phase range includes a phase ranging from 0 degrees to 180 degrees and a phase ranging from 270 degrees to 360 degrees. When the phase value of the input voltage ranges from 180 degrees to 270 degrees, alternate turn-on of the auxiliary power switch and the main power switch can ensure bootstrap charging of the main power switch, thereby ensuring normal operation of the totem-pole power factor correction circuit.

In an embodiment of the first aspect, the predetermined voltage value may be set to k times a peak voltage of the output voltage provided by the totem-pole power factor correction circuit. k is a constant greater than 0 and less than 1. The predetermined voltage value provided in this embodiment may be preset, may be set in advance, or may be adjusted by the control circuit based on different situations. Therefore, control flexibility can be improved.

A second aspect of the embodiments provides a control circuit of a totem-pole power factor correction circuit. The totem-pole power factor correction circuit includes a control circuit, a main power switch, and an auxiliary power switch. In response to a case in which a phase value of an input voltage is within a predetermined phase range, and an absolute value of a voltage value of the input voltage is less than a predetermined voltage value, the control circuit controls the main power switch to be turned on and off, and controls the auxiliary power switch to remain off.

In an embodiment of the second aspect, the control circuit is further configured to: in response to a case in which the phase value of the input voltage is not within the predetermined phase range, control the main power switch and the auxiliary power switch to be alternately turned on and off.

In an embodiment of the second aspect, the control circuit is further configured to: in response to a case in which the absolute value of the voltage value of the input voltage is greater than or equal to the predetermined voltage value, control the main power switch and the auxiliary power switch to be alternately turned on and off.

In an embodiment of the second aspect, the predetermined phase range includes: 0 degrees to 180 degrees, and 270 degrees to 360 degrees.

In an embodiment of the second aspect, the predetermined voltage value is k times a peak voltage of the output voltage. k is greater than 0 and less than 1.

A third aspect of the embodiments provides a totem-pole power factor correction circuit, including a half-bridge circuit and a control circuit. The half-bridge circuit includes a main power switch and an auxiliary power switch. The totem-pole power factor correction circuit is configured to receive an input voltage, and provide an output voltage. The control circuit is configured to output a control signal to the half-bridge circuit. The main power switch and the auxiliary power switch are alternately turned on and off based on the control signal. Duration of each on-session of the main power switch is negatively correlated with an absolute value of a voltage value of the input voltage. Therefore, when the input voltage is low, on-duration of the main power switch is long. This increases duration for charging an inductor by using the input voltage, thereby increasing energy after the inductor is charged. Finally, a voltage value provided by the inductor to one side of the auxiliary power switch is increased, which can avoid turn-on of the auxiliary power switch in a case of different voltages at both sides of the auxiliary power switch within the duration. Therefore, according to this embodiment, a switching loss of the auxiliary power switch in the totem-pole power factor correction circuit 111 can be reduced, and operating efficiency of the totem-pole power factor correction circuit 111 and a power module 11 including the totem-pole power factor correction circuit 111 can be improved. In addition, a structure of an existing totem-pole power factor correction circuit 111 is not improved, and effects of a simple circuit structure and low costs are further achieved.

In an embodiment of the third aspect, the duration of each on-session of the main power switch is n times preset duration of each on-session of the main power switch. n is negatively correlated with the absolute value of the voltage value of the input voltage. A manner provided in this embodiment to determine the on-duration of the main power switch is simple and easy to implement.

A fourth aspect of the embodiments provides a control circuit of a totem-pole power factor correction circuit. The totem-pole power factor correction circuit includes a main power switch and an auxiliary power switch. The control circuit is configured to control the main power switch and the auxiliary power switch to be alternately turned on and off, and control duration of each on-session of the main power switch to be negatively correlated with an absolute value of a voltage value of an input voltage.

In an embodiment of the fourth aspect, the duration of each on-session of the main power switch is n times preset duration of each on-session of the main power switch. n is negatively correlated with the absolute value of the voltage value of the input voltage.

A fifth aspect of the embodiments provides a power module, configured to obtain an input voltage, and supply power to a load. The power module includes a direct current conversion circuit and the totem-pole power factor correction circuit provided in any one of the first aspect or the third aspect of this application. The totem-pole power factor correction circuit is configured to obtain the input voltage, and provide an output voltage. The direct current conversion circuit is configured to perform voltage conversion on the output voltage, and then supply power to the load.

BRIEF DESCRIPTION OF DRAWINGS

To describe the solutions in the embodiments more clearly, the following briefly describes the accompanying drawings required for describing embodiments. It is clear that the accompanying drawings in the following description show merely some embodiments, and a person of ordinary skill in the art may still derive other drawings from these accompanying drawings without creative efforts.

DETAILED DESCRIPTION OF EMBODIMENTS

The following clearly describes the solutions in the embodiments with reference to the accompanying drawings. It is clear that the described embodiments are merely some, but not all, of the embodiments. All other embodiments obtained by a person of ordinary skill in the art based on embodiments herein without creative efforts shall fall within the scope of these embodiments.

In the embodiments and accompanying drawings, the terms "first", "second", "third", "fourth", and the like (if existing) are intended to distinguish between similar objects, but do not necessarily indicate a specific order or sequence. It should be understood that data termed in such a way are interchangeable in proper circumstances, so that embodiments described herein can be implemented in orders except the order illustrated or described herein. In addition, the terms "include" and "have" and any other variants are intended to cover the non-exclusive inclusion. For example, a process, method, system, product, or device that includes a list of steps or units is not necessarily limited to those expressly listed steps or units, but may include other steps or units not expressly listed or inherent to such a process, method, product, or device.

The connection relationship described in the embodiments is a direct or indirect connection. For example, that A is connected to B may not only be that A is directly connected to B, but also be that A is indirectly connected to B by using one or more other electrical components. For example, it may be that A is directly connected to C, and C is directly connected to B. In this way, A is connected to B by using C. It may be further understood that "A is connected to B" described may be that A is directly connected to B, or may be that A is indirectly connected to B by using one or more other electrical components.

Figure 1:
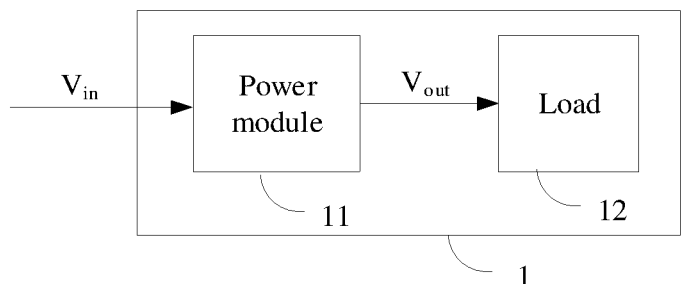
FIG. 1 is a schematic diagram of a structure of an electronic device according to an embodiment.

FIG. 1 is a schematic diagram of a structure of an electronic device according to an embodiment. As shown in FIG. 1, the electronic device 1 includes a power module 11 and a load 12. The power module 11 is configured to receive an input voltage $V_{in}$, and provide an output voltage $V_{out}$ to supply power to the load 12. In an embodiment, the input voltage $V_{in}$ may be provided by an external power supply, or may be provided by an internal power supply of the electronic device 1.

The electronic device 1 provided in the embodiment shown in FIG. 1 may be an electric device, such as a mobile phone, a notebook computer, a computer chassis, a television, a smart tablet, an interactive tablet, an electric vehicle, a smart furniture device, a smartwatch, or a wearable device. The power module 11 provided in this embodiment may be used in the electronic device 1 shown in FIG. 1.

Figure 2:
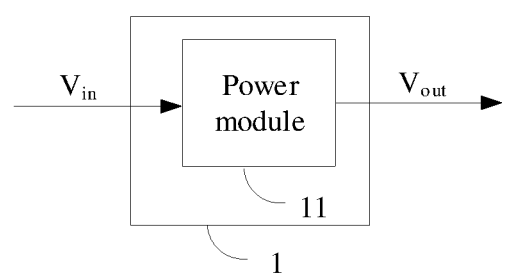
FIG. 2 is a schematic diagram of a structure of an electronic device according to an embodiment.

FIG. 2 is a schematic diagram of a structure of an electronic device according to an embodiment. As shown in FIG. 2, the electronic device 1 includes a power module 11. The power module 11 is configured to receive an input voltage $V_{in}$, and provide an output voltage $V_{out}$ to supply power to a load subsequently connected to the electronic device 1. In an embodiment, the input voltage $V_{in}$ may be provided by an external power supply, or may be provided by an internal power supply of the electronic device 1.

The electronic device 1 provided in the embodiment shown in FIG. 2 may be a power supply device such as a power adapter, a charger, a car charging station, or a mobile power supply. The power module provided in this embodiment may be used in the electronic device 1 shown in FIG. 2.

In an embodiment, the electronic device 1 may include a plurality of power modules 11, and the plurality of power modules 11 provide the output voltage $V_{out}$ to supply power to the load 12. In an embodiment, the electronic device 1 may include a plurality of loads 12, and the power module 11 provides a plurality of output voltages $V_{out}$ to supply power to the plurality of loads 12. In an embodiment of this application, the electronic device 1 may include a plurality of power modules 11 and a plurality of loads 12, and the plurality of power modules 11 provide a plurality of output voltages $V_{out}$ to supply power to the plurality of loads 12.

In an embodiment, the input voltage $V_{in}$ may be an alternating current, and the power module 11 may include an alternating current-direct current conversion circuit. In this embodiment, the input voltage $V_{in}$ may be a direct current, the internal power supply may include an energy storage apparatus, and the power module 11 may include a direct current conversion circuit. Correspondingly, when the electronic device 1 operates independently, the energy storage apparatus of the internal power supply may supply power to the power module 11.

In an embodiment, the input voltage $V_{in}$ may be a direct current. The load 12 of the electronic device 1 may include one or more of an electric apparatus, an energy storage apparatus, or an external device. In an embodiment, the load 12 may be an electric apparatus of the electronic device 1, for example, a processor or a display. In an embodiment, the load 12 may be an energy storage apparatus of the electronic device 1, for example, a battery. In an embodiment, the load 12 may be an external device of the electronic device 1, for example, another electronic device such as a display or a keyboard.

Figure 3:
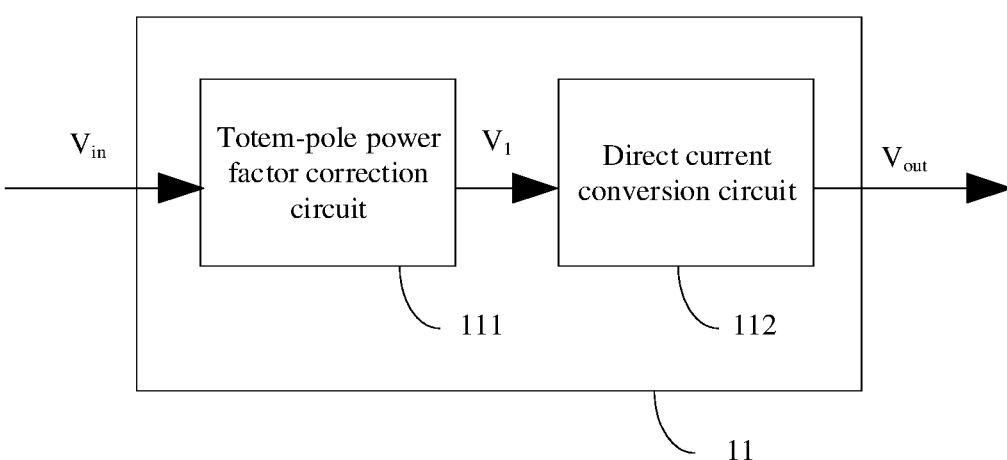
FIG. 3 is a schematic diagram of a structure of a power module according to an embodiment.

FIG. 3 is a schematic diagram of a structure of a power module according to an embodiment. The power module 11 shown in FIG. 3 may be used in the electronic device 1 shown in FIG. 1 or FIG. 2. The power module 11 includes a totem-pole power factor correction (PFC) circuit 111 and a direct current conversion circuit 112. The power module 11 is configured to receive an input voltage $V_{in}$, perform power factor correction processing, and then provide an output voltage $V_{out}$. The input voltage $V_{in}$ is an alternating current. The output voltage $V_{out}$ is a direct current.

The totem-pole power factor correction circuit 111 is configured to receive the input voltage $V_{in}$ of the power module 11, rectify the input voltage $V_{in}$ of the power module 11, perform power factor correction processing, and then provide an output voltage $V_1$ for the direct current conversion circuit 112. The output voltage $V_1$ of the totem-pole power factor correction circuit 111 is a direct current. Circuit parameters such as phases of the output voltage $V_1$ of the totem-pole power factor correction circuit 111 and the input voltage $V_{in}$ of the totem-pole power factor correction circuit 111 are different. In an embodiment, a voltage value of the input voltage $V_{in}$ of the totem-pole power factor correction circuit 111 may be equal to that of the output voltage $V_1$ of the totem-pole power factor correction circuit 111. Alternatively, a voltage value of the input voltage $V_{in}$ of the totem-pole power factor correction circuit 111 is greater than that of the output voltage $V_1$ of the totem-pole power factor correction circuit 111.

The direct current conversion circuit 112 is configured to receive the output voltage $V_1$ of the totem-pole power factor correction circuit 111, perform voltage conversion on the output voltage $V_1$, and provide the output voltage $V_{out}$ of the power module 11. The direct current conversion circuit 112 may be a circuit with an isolation function. For example, the direct current conversion circuit 112 may be one of an asymmetrical half-bridge (AHB) flyback conversion circuit or an active clamp flyback (ACF) conversion circuit. Alternatively, the direct current conversion circuit 112 may be a circuit with a non-isolation function. For example, the direct current conversion circuit 112 may be one of a boost circuit, a buck circuit, or a buck/boost (buck-boost) circuit.

The totem-pole power factor correction circuit 111 includes a control circuit, at least one inductor, and at least one switching transistor. The control circuit may be configured to send a control signal to the at least one switching transistor, so that the at least one switching transistor is turned on or off based on the control signal, to control the at least one inductor to be charged or discharged through the turned-on switching transistor. When the at least one inductor is charged, the input voltage $V_{in}$ of the totem-pole power factor correction circuit 111 charges the at least one inductor. When the at least one inductor is discharged, the at least one inductor provides the output voltage $V_1$ for the direct current conversion circuit 112. The control circuit may adjust a power factor of the output voltage of the totem-pole power factor correction circuit 111 by adjusting charging time and/or discharging time of the at least one inductor.

In an embodiment, the control circuit of the totem-pole power factor correction circuit 111 may include a pulse width modulation (PWM) controller, a central processing unit (CPU), another general-purpose processor, a digital signal processor (DSP), an application-specific integrated circuit (ASIC), a field-programmable gate array (FPGA) or another programmable logic device, a discrete gate, a transistor logic device, or the like.

In an embodiment, the switching transistor of the totem-pole power factor correction circuit 111 may be any one of a metal-oxide semiconductor field-effect transistor (MOSFET), an insulated gate bipolar transistor (IGBT), a bipolar power transistor, a wide band-gap semiconductor field-effect transistor, or the like.

In an embodiment, the switching transistor is driven to be turned on at a high level and turned off at a low level. For example, the control circuit sends a high-level control signal to the switching transistor, and the switching transistor is turned on based on the control signal. The control circuit sends a low-level control signal to the switching transistor, and the switching transistor is turned off based on the control signal. Alternatively, the control circuit sends no control signal to the switching transistor, and the switching transistor is turned off when receiving no control signal. It may be understood that in various embodiments, the switching transistor may alternatively be driven in another manner. A driving manner of the switching transistor is not limited in the embodiments.

Figure 4:
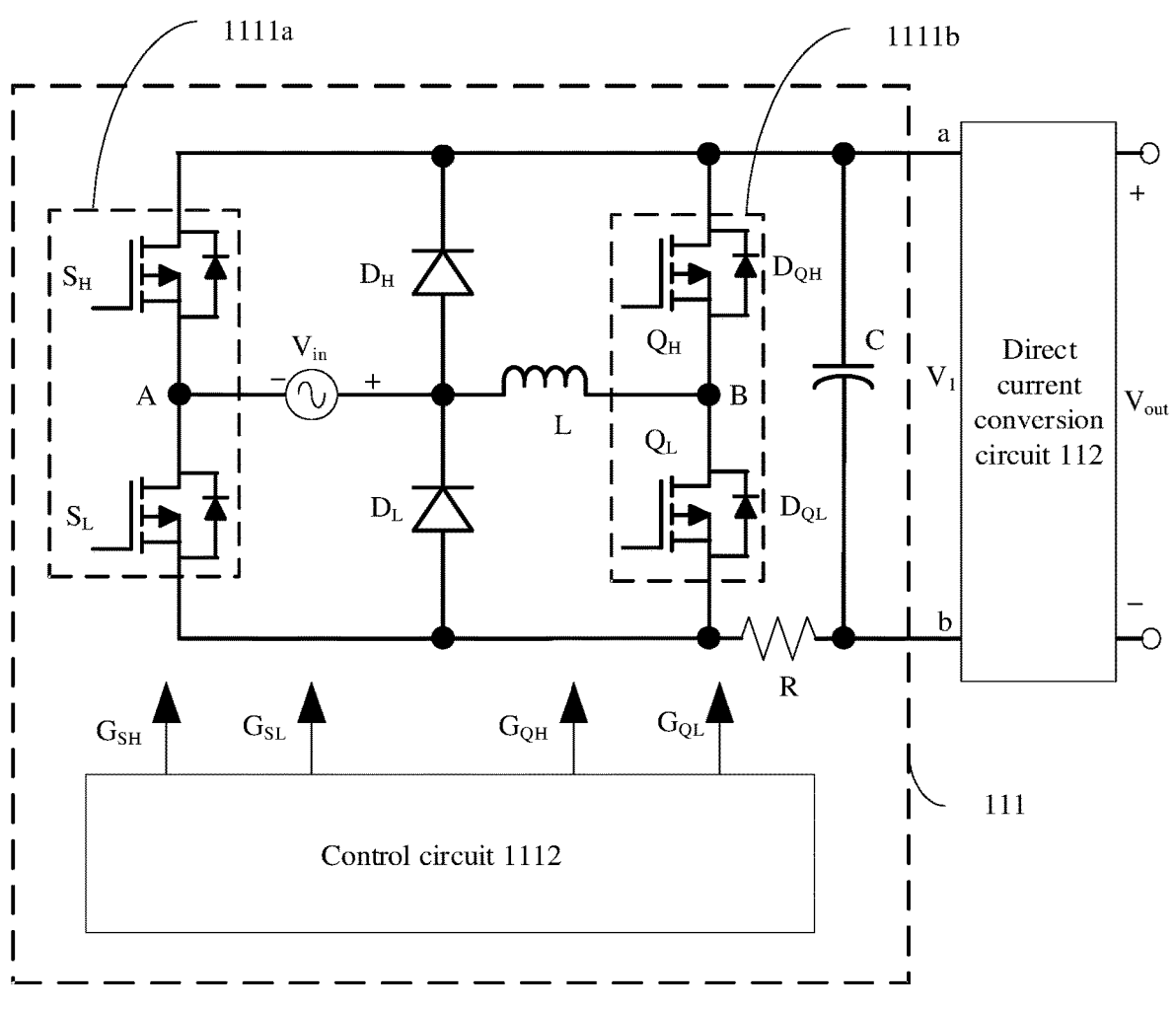
FIG. 4 is a schematic diagram of a structure of a power module according to and embodiment.

FIG. 4 is a schematic diagram of a structure of a power module according to an embodiment. The power module shown in FIG. 4 includes a totem-pole power factor correction circuit 111 and a direct current conversion circuit 112. The totem-pole power factor correction circuit 111 is configured to receive an input voltage $V_{in}$, perform rectification and power factor correction processing, and then provide an output voltage $V_1$ for the direct current conversion circuit 112.

An example in which the totem-pole power factor correction circuit 111 provided in FIG. 4 is a bridgeless totem-pole power factor correction circuit is used. The totem-pole power factor correction circuit 111 includes an inductor L, a first switch $S_L$, a second switch $S_H$, a third switch $Q_L$, and a fourth switch $Q_H$. The first switch $S_L$ and the second switch $S_H$ are connected in series to form a half-bridge circuit 1111a. A bridge arm midpoint A of the half-bridge circuit 1111a is connected to a negative electrode of the input voltage $V_{in}$. The half-bridge circuit 1111a is further connected in parallel between an interface a and an interface b of an output end of the totem-pole power factor correction circuit 111. The third switch $Q_L$ and the fourth switch $Q_H$ are connected in series to form a half-bridge circuit 1111b. A bridge arm midpoint B of the half-bridge circuit 1111b is connected to one end of the inductor L. The other end of the inductor L is connected to a positive electrode of the input voltage $V_{in}$. The half-bridge circuit 1111b is further connected in parallel between the interface a and the interface b of the output end of the totem-pole power factor correction circuit 111.

The control circuit 1112 is configured to send a first control signal $G_{SL}$ to the first switch $S_L$, and the first switch $S_L$ is turned on based on the first control signal $G_{SL}$. The control circuit 1112 is configured to send a second control signal $G_{SH}$ to the second switch $S_H$, and the second switch $S_H$ is turned on based on the second control signal $G_{SH}$. The control circuit 1112 is configured to send a third control signal $G_{QL}$ to the third switch $Q_L$, and the third switch $Q_L$ is turned on based on the third control signal $G_{QL}$. The control circuit 1112 is configured to send a fourth control signal $G_{QH}$ to the fourth switch $Q_H$, and the fourth switch $Q_H$ is turned on based on the fourth control signal $G_{QH}$.

Figure 5:
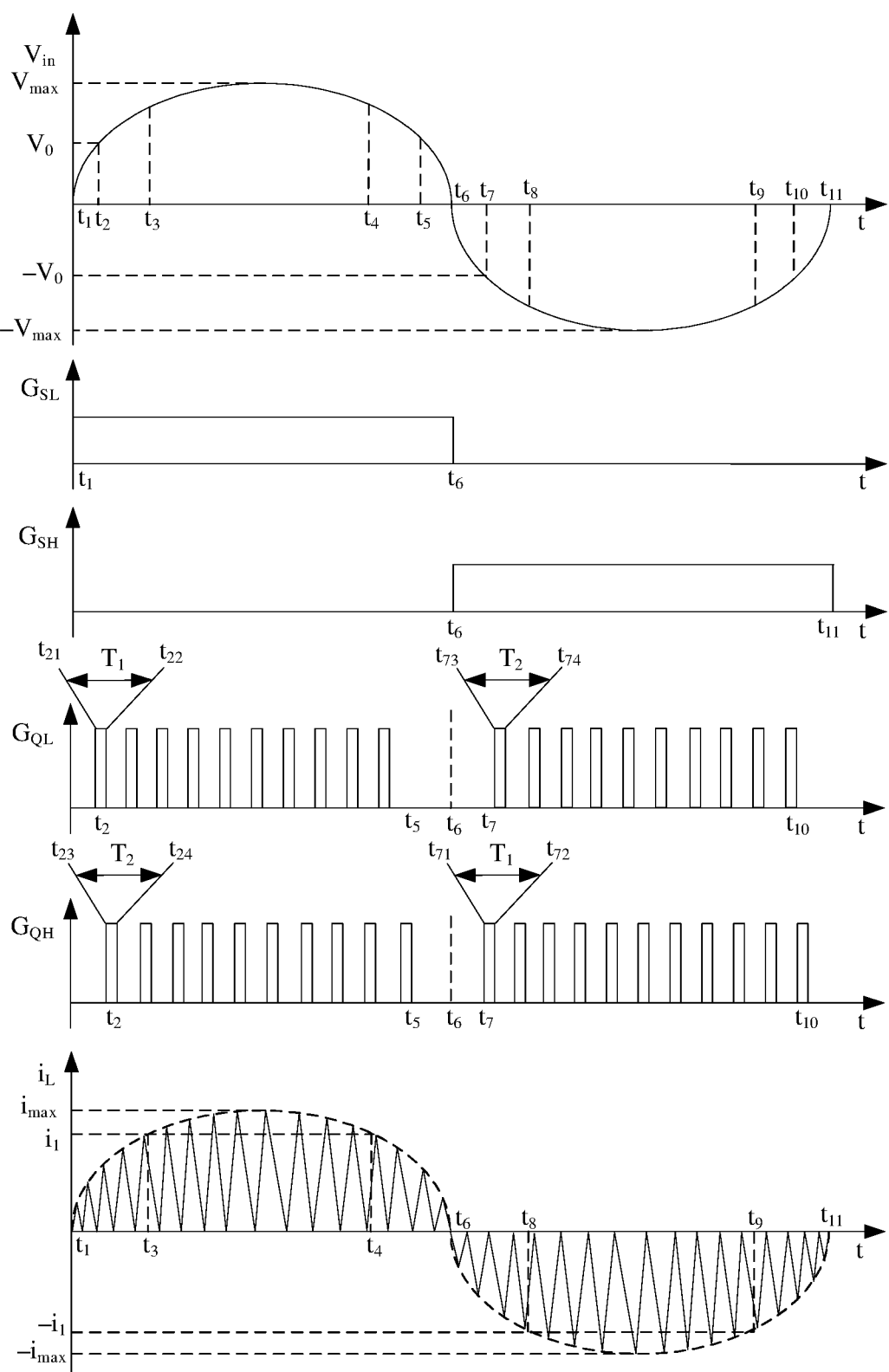
FIG. 5 is a schematic diagram of a control logic of a control circuit of a totem-pole power factor correction circuit.

FIG. 5 is a schematic diagram of a control logic of a control circuit of a totem-pole power factor correction circuit. The following describes the control logic in FIG. 5 with reference to the totem-pole power factor correction circuit 111 provided in FIG. 4.

At a moment $t_1$, a voltage value of the input voltage $V_{in}$ received by the totem-pole power factor correction circuit 111 increases from 0. The control circuit 1112 sends the first control signal $G_{SL}$ to the first switch $S_L$, so that the first switch $S_L$ is turned on based on the first control signal $G_{SL}$. In addition, the second switch $S_H$ is turned off. After the moment $t_1$ and before a moment $t_6$, the voltage value of the input voltage $V_{in}$ remains positive, and the control circuit 1112 continuously sends the first control signal $G_{SL}$ to the first switch $S_L$, so that the first switch $S_L$ remains on, and the second switch $S_H$ remains off.

Before a moment $t_2$, because the voltage value of the input voltage $V_{in}$ is small, some control circuits 1112 provide a low voltage protection function for the totem-pole power factor correction circuit 111. When the voltage value of the input voltage $V_{in}$ received by the totem-pole power factor correction circuit 111 is less than $V_0$, the control circuit 1112 does not send the third control signal $G_{QL}$ to the third switch $Q_L$, and does not send the fourth control signal $G_{QH}$ to the fourth switch $Q_H$, and the third switch $Q_L$ and the fourth switch $Q_H$ are turned off.

After the moment $t_2$, the voltage value of the input voltage $V_{in}$ received by the totem-pole power factor correction circuit 111 is greater than $V_0$, and the control circuit 1112 controls the third switch $Q_L$ and the fourth switch $Q_H$ to be alternately turned on, so that the inductor L is alternately charged through the third switch $Q_L$ and discharged through the fourth switch $Q_H$. Between the moment $t_1$ and the moment $t_6$ (including the moment t1 and the moment t6), the third switch $Q_L$ configured to charge the inductor L is denoted as a main power switch, and the fourth switch $Q_H$ configured to discharge the inductor L is denoted as an auxiliary power switch.

For example, at a moment $t_{21}$ after the moment $t_2$, the control circuit 1112 sends the third control signal $G_{QL}$ to the third switch $Q_L$, so that the third switch $Q_L$ is turned on based on the third control signal $G_{QL}$. In addition, the fourth switch $Q_H$ is turned off. In this case, the input voltage $V_{in}$ charges the inductor L through the third switch $Q_L$ and the first switch $S_L$, and a current $i_L$ flowing through the inductor L gradually increases.

After the control circuit 1112 sends the third control signal $G_{QL}$ to the third switch $Q_L$ for first preset duration $T_1$, at a moment $t_{22}$, the control circuit 1112 stops sending the third control signal $G_{QL}$ to the third switch $Q_L$, the third switch $Q_L$ is turned off, the fourth switch $Q_H$ is turned off, and the input voltage $V_{in}$ stops charging the inductor L.

At a moment $t_{23}$ after the moment $t_{22}$, the control circuit 1112 sends the fourth control signal $G_{QH}$ to the fourth switch $Q_H$, so that the fourth switch $Q_H$ is turned on based on the fourth control signal $G_{QH}$, and the third switch $Q_L$ is turned off. In this case, the inductor L is discharged through the fourth switch $Q_H$, an output end a and an output end b of the totem-pole power factor correction circuit 111, and the first switch $S_L$, to provide the output voltage $V_1$ for the direct current conversion circuit 112. For example, the fourth switch $Q_H$ is a MOS transistor, and a current discharged by the inductor L flows between a source and a drain of the MOS transistor.

After the control circuit 1112 sends the fourth control signal $G_{QH}$ to the fourth switch $Q_H$ for second preset duration $T_2$, at a moment $t_{24}$, the control circuit 1112 stops sending the fourth control signal $G_{QH}$ to the fourth switch $Q_H$, the third switch $Q_L$ is turned off, the fourth switch $Q_H$ is turned off, and the inductor L stops discharging through a source and a drain of the fourth switch $Q_H$.

After a moment $t_5$, the voltage value of the input voltage $V_{in}$ received by the totem-pole power factor correction circuit 111 is less than $V_0$, the control circuit 1112 does not send the third control signal $G_{QL}$ to the third switch $Q_L$, and does not send the fourth control signal $G_{QH}$ to the fourth switch $Q_H$, and the third switch $Q_L$ and the fourth switch $Q_H$ are turned off.

At a moment $t_6$, the voltage value of the input voltage $V_{in}$ received by the totem-pole power factor correction circuit 111 decreases from 0. The control circuit 1112 sends the second control signal $G_{SH}$ to the second switch $S_H$, so that the second switch $S_H$ is turned on based on the second control signal $G_{SH}$. In addition, the first switch $S_L$ is turned off. After the moment $t_6$ and before a moment $t_{11}$, the voltage value of the input voltage $V_{in}$ remains negative, and the control circuit 1112 continuously sends the second control signal $G_{SH}$ to the second switch $S_H$, so that the second switch $S_H$ remains on, and the first switch $S_L$ remains off.

After the moment $t_6$ and before a moment $t_7$, the voltage value of the input voltage $V_{in}$ received by the totem-pole power factor correction circuit 111 is less than $V_0$, the control circuit 1112 does not send the third control signal $G_{QL}$ to the third switch $Q_L$, and does not send the fourth control signal $G_{QH}$ to the fourth switch $Q_H$, and the third switch $Q_L$ and the fourth switch $Q_H$ are turned off.

After the moment $t_7$, the voltage value of the input voltage $V_{in}$ received by the totem-pole power factor correction circuit 111 is greater than $V_0$, and the control circuit 1112 controls the third switch $Q_L$ and the fourth switch $Q_H$ to be alternately turned on, so that the inductor L is alternately charged through the fourth switch $Q_H$ and discharged through the third switch $Q_L$. Between the moment $t_6$ and the moment $t_{11}$, the fourth switch $Q_H$ configured to charge the inductor L is denoted as the main power switch, and the third switch $Q_L$ configured to discharge the inductor L is denoted as the auxiliary power switch.

For example, between a moment $t_{71}$ and a moment $t_{72}$ after the moment $t_7$, the control circuit 1112 sends the fourth control signal $G_{QH}$ to the fourth switch $Q_H$, so that the fourth switch $Q_H$ is turned on based on the fourth control signal $G_{QH}$. In addition, the third switch $Q_L$ is turned off. The input voltage $V_{in}$ charges the inductor L through the second switch $S_H$ and the fourth switch $Q_H$, and the current $i_L$ flowing through the inductor L gradually increases. Between a moment $t_{73}$ and a moment $t_{74}$ after the moment $t_{72}$, the control circuit 1112 sends the third control signal $G_{QL}$ to the third switch $Q_L$, so that the third switch $Q_L$ is turned on based on the third control signal $G_{QL}$. In addition, the fourth switch $Q_H$ is turned off. The inductor L provides the output voltage $V_1$ for the direct current conversion circuit 112 through the third switch $Q_L$, the output end b and the output end a of the totem-pole power factor correction circuit 111 and the second switch $S_H$.

After a moment $t_{10}$, the voltage value of the input voltage $V_{in}$ received by the totem-pole power factor correction circuit 111 is less than $V_0$, the control circuit 1112 does not send the third control signal $G_{QL}$ to the third switch $Q_L$, and does not send the fourth control signal $G_{QH}$ to the fourth switch $Q_H$, and the third switch $Q_L$ and the fourth switch $Q_H$ are turned off.

It may be understood that the input voltage $V_{in}$ received by the totem-pole power factor correction circuit 111 changes periodically. Therefore, in each change cycle, the control circuit 1112 may control the totem-pole power factor correction circuit 111 according to the control logic between the moment $t_1$ and the moment $t_{11}$ shown in FIG. 5.

However, if a peak voltage $V_{in}$ of the input voltage $V_{in}$ received by the totem-pole power factor correction circuit 111 is low, between the moment $t_1$ and a moment $t_3$, between a moment $t_4$ and a moment $t_8$, and between a moment $t_9$ and the moment $t_{11}$, after the control circuit 1112 controls the main power switch to be turned on, a voltage and a current are low when the input voltage $V_{in}$ charges the inductor L. Subsequently, after the control circuit 1112 controls the main power switch to be turned off, energy stored in the inductor L is low. Therefore, before the control circuit 1112 controls the auxiliary power switch to be turned on, the energy stored in the inductor L cannot resonate a voltage value at the midpoint B of the second half-bridge circuit to a large voltage value. The voltage value provided by the midpoint B of the second half-bridge circuit is less than that of the output voltage $V_1$ provided by a back end of the totem-pole power factor correction circuit 111 for the direct current conversion circuit 112. As a result, when the control circuit 1112 controls the auxiliary power switch to be turned on, voltages at both sides of the auxiliary power switch are different, which causes "hard turn-on" of the auxiliary power switch, further increases a switching loss of the auxiliary power switch, and affects operating efficiency of the totem-pole power factor correction circuit 111 and the power module 11 including the totem-pole power factor correction circuit 111.

In some conventional technologies, a plurality of auxiliary inductors are further disposed in the totem-pole power factor correction circuit 111. The plurality of auxiliary inductors are connected in parallel with the inductor L. In this case, the input voltage $V_{in}$ may charge the inductor L and the plurality of auxiliary inductors at the same time. Even if the voltage value of the input voltage $V_{in}$ is small, the plurality of inductors can simultaneously resonate the voltage value at the midpoint B of the second half-bridge circuit to a large voltage value. Therefore, when the control circuit 1112 controls the auxiliary power switch to be turned on, the voltages at both sides of the auxiliary power switch are the same. However, in the conventional technologies, more inductors need to be disposed in the totem-pole power factor correction circuit 111, which increases complexity of a circuit structure. In addition, the inductor has a large surface area, and occupies large space, which is not conducive to miniaturization design and power density improvement of a power supply and an electronic device.

Embodiments provide a power module, a totem-pole power factor correction circuit, and a control circuit thereof, to resolve a problem of hard turn-on of the auxiliary power switch when the control circuit 1112 of the totem-pole power factor correction circuit 111 in FIG. 5 controls the auxiliary power switch to be turned on. Therefore, the switching loss can be reduced, operating efficiency of the totem-pole power factor correction circuit 111 and the power module 11 including the totem-pole power factor correction circuit 111 can be improved, and effects of a simple circuit structure, low costs, and the like are further achieved. Additional embodiments are used below to describe the solutions. The following several embodiments may be combined with each other, and a same or similar concept or process may not be described repeatedly in some embodiments.

Figure 6:
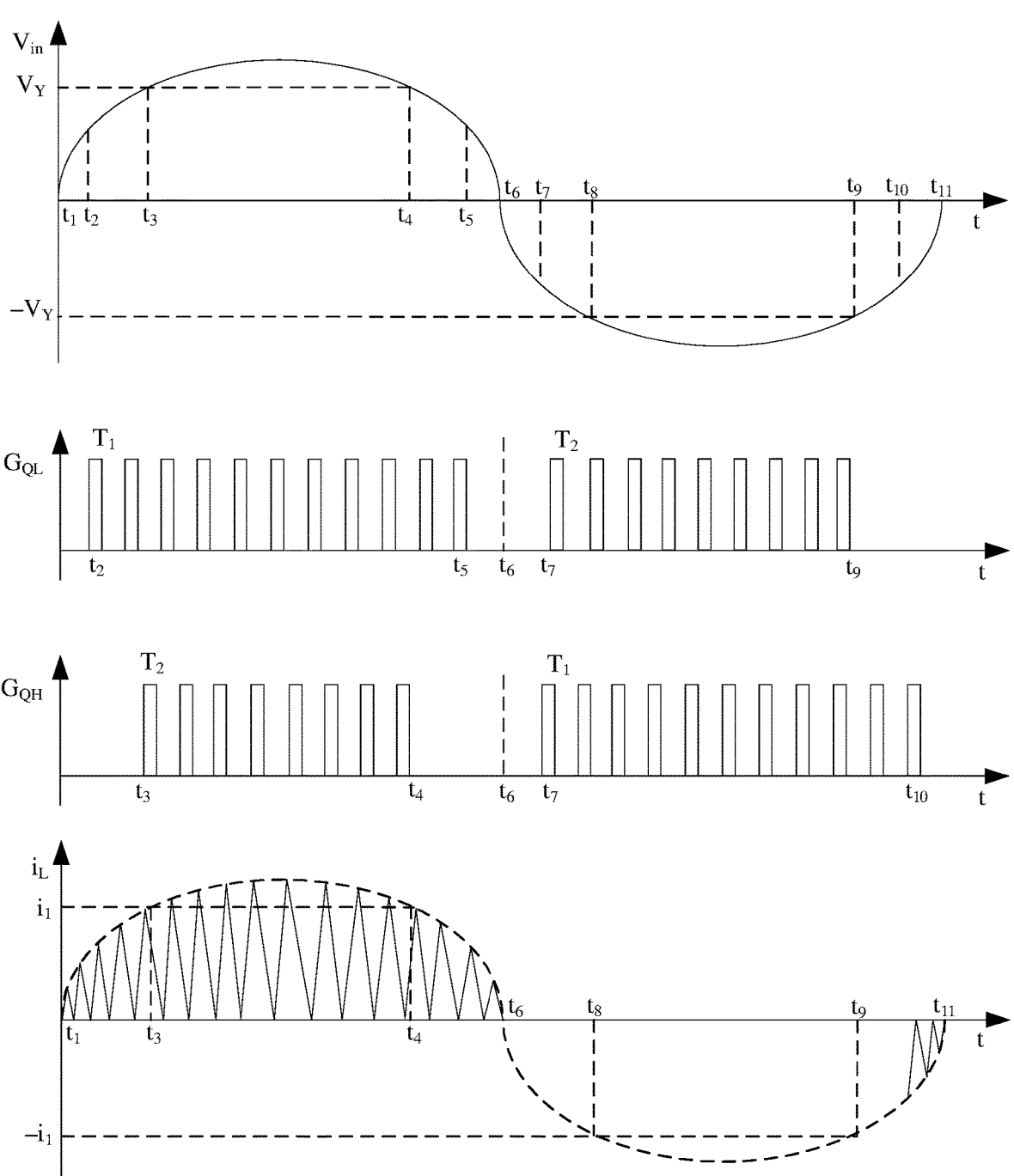
FIG. 6 is a schematic diagram of a control logic of a control circuit of a totem-pole power factor correction circuit according to an embodiment.

FIG. 6 is a schematic diagram of a control logic of a control circuit of a totem-pole power factor correction circuit according to an embodiment. The control logic shown in FIG. 6 may be applied to the power module 11 shown in FIG. 4, and is used by the control circuit 1112 of the totem-pole power factor correction circuit 111 to control the half-bridge circuit 1111*b*. The following describes, with reference to the power factor correction circuit provided in FIG. 4, the control logic in FIG. 6 provided in an embodiment.

At a moment $t_1$, a voltage value of the input voltage $V_{in}$ received by the totem-pole power factor correction circuit 111 increases from 0. The control circuit 1112 sends the first control signal $G_{SL}$ to the first switch $S_L$, so that the first switch $S_L$ is turned on based on the first control signal $G_{SL}$. In addition, the second switch $S_H$ is turned off. After the moment $t_1$ and before a moment t 6, the voltage value of the input voltage $V_{in}$ remains positive, and the control circuit 1112 continuously sends the first control signal $G_{SL}$ to the first switch $S_L$, so that the first switch $S_L$ remains on, and the second switch $S_H$ remains off. Between the moment $t_1$ and the moment $t_6$, the third switch $Q_L$ configured to charge the inductor L is denoted as a main power switch, and the fourth switch $Q_H$ configured to discharge the inductor L is denoted as an auxiliary power switch.

After the moment $t_1$ and before a moment $t_2$, the voltage value of the input voltage $V_{in}$ received by the totem-pole power factor correction circuit 111 is less than $V_0$, the control circuit 1112 does not send the third control signal $G_{QL}$ to the third switch $Q_L$, and does not send the fourth control signal $G_{QH}$ to the fourth switch $Q_H$, and the third switch $Q_L$ and the fourth switch $Q_H$ are turned off.

After the moment $t_2$ and before a moment $t_3$, the voltage value of the input voltage $V_{in}$ received by the totem-pole power factor correction circuit 111 is greater than $V_0$ and less than a predetermined voltage value $V_Y$, and the control circuit 1112 controls the third switch $Q_L$ to be alternately turned on and off, and controls the fourth switch $Q_H$ to be turned off.

In an embodiment, between the moment $t_2$ and the moment $t_3$, in response to a case in which an absolute value of the voltage value of the input voltage $V_{in}$ is greater than $V_0$ and less than the predetermined voltage value $V_Y$, and a phase value of the input voltage $V_{in}$ is within a predetermined phase range, the control circuit 1112 periodically sends the third control signal $G_{QL}$ to the third switch $Q_L$, for first preset duration $T_1$ each time, so that the third switch $Q_L$ is periodically turned on based on the third control signal $G_{QL}$. In addition, the control circuit 1112 does not send the fourth control signal $G_{QH}$ to the fourth switch $Q_H$, so that the fourth switch $Q_H$ is turned off.

In an embodiment, the predetermined phase range includes a phase ranging from 0 degrees to 180 degrees and a phase ranging from 270 degrees to 360 degrees.

In an embodiment, the predetermined voltage value $V_Y$ may be set to k times a peak voltage of the output voltage $V_1$ provided by the totem-pole power factor correction circuit 111. k is a constant greater than 0 and less than 1. For example, when a peak voltage of the input voltage $V_{in}$ is greater than a preset voltage, the predetermined voltage value $V_Y$ may be set to $\frac{3}{8}*V_1$. When a peak voltage of the input voltage $V_{in}$ is less than a preset voltage, the predetermined voltage value $V_Y$ may be set to $\frac{3}{16}*V_1$.

It should be noted that the predetermined phase range and the predetermined voltage value provided in this embodiment are merely examples. Specific values of the predetermined phase range and the predetermined voltage value are not limited. The specific values of the predetermined phase range and the predetermined voltage value may be preset, may be set in advance, or may be adjusted by the control circuit based on different situations.

In an embodiment, between the moment $t_2$ and the moment $t_3$, when the third switch $Q_L$ is turned on, and the fourth switch $Q_H$ is turned off, the input voltage $V_{in}$ charges the inductor L through the third switch $Q_L$ and the first switch $S_L$, and a current $i_L$ flowing through the inductor L gradually increases. When the third switch $Q_L$ is turned off, and the fourth switch $Q_H$ is turned off, for example, the fourth switch $Q_H$ is a MOS transistor, the inductor L is discharged through a body diode $D_{QH}$ of the fourth switch $Q_H$, an output end a and an output end b of the totem-pole power factor correction circuit 111, and the first switch $S_L$, to provide the output voltage $V_1$ for the direct current conversion circuit 112.

After the moment $t_3$ and before a moment $t_4$, the voltage value of the input voltage $V_{in}$ received by the totem-pole power factor correction circuit 111 is greater than the predetermined voltage value $V_Y$, and the control circuit 1112 controls the third switch $Q_L$ and the fourth switch $Q_H$ to be alternately turned on.

In an embodiment, between the moment $t_3$ and the moment $t_4$, in response to a case in which the absolute value of the voltage value of the input voltage $V_{in}$ is greater than or equal to the predetermined voltage value $V_Y$, and the phase value of the input voltage $V_{in}$ is not within the predetermined phase range, the control circuit 1112 periodically sends the third control signal $G_{QL}$ to the third switch $Q_L$, and sends the fourth control signal $G_{QH}$ to the fourth switch $Q_H$, so that the third switch $Q_L$ and the fourth switch $Q_H$ are alternately turned on. Duration in which the control circuit 1112 sends the third control signal $G_{QL}$ each time to the third switch $Q_L$, the main power switch, is the first preset duration $T_1$, and duration of each on-session of the third switch $Q_L$ is the first preset duration $T_1$. Duration in which the control circuit 1112 sends the fourth control signal $G_{QH}$ each time to the fourth switch $Q_H$, the auxiliary power switch, is second preset duration $T_2$, and duration of each on-session of the fourth switch $Q_H$ is the second preset duration $T_2$.

In an embodiment, between the moment $t_3$ and the moment $t_4$, when the third switch $Q_L$ is turned on, and the fourth switch $Q_H$ is turned off, the input voltage $V_{in}$ charges the inductor L through the third switch $Q_L$ and the first switch $S_L$, and a current $i_L$ flowing through the inductor L gradually increases. When the third switch $Q_L$ is turned off, and the fourth switch $Q_H$ is turned off, for example, the fourth switch $Q_H$ is a MOS transistor, the inductor L is discharged through a body diode $D_{QH}$ of the fourth switch $Q_H$, the output end a and the output end b of the totem-pole power factor correction circuit 111, and the first switch $S_L$, to provide the output voltage $V_1$ for the direct current conversion circuit 112. When the third switch $Q_L$ is turned off, and the fourth switch $Q_H$ is turned on, the inductor L is discharged through a source and a drain of the fourth switch $Q_H$, the output end a and the output end b of the totem-pole power factor correction circuit 111, and the first switch $S_L$, to provide the output voltage $V_1$ for the direct current conversion circuit 112.

After the moment $t_4$ and before a moment $t_5$, in response to a case in which the absolute value of the voltage value of the input voltage $V_{in}$ is greater than $V_0$ and less than the predetermined voltage value $V_Y$, and the phase value of the input voltage $V_{in}$ is within the predetermined phase range, the control circuit 1112 periodically sends the third control signal $G_{QL}$ to the third switch $Q_L$, for the first preset duration $T_1$ each time, so that the third switch $Q_L$ is periodically turned on based on the third control signal $G_{QL}$. In addition, the control circuit 1112 does not send the fourth control signal $G_{QH}$ to the fourth switch $Q_H$, so that the fourth switch $Q_H$ is turned off.

After the moment $t_5$, the voltage value of the input voltage $V_{in}$ received by the totem-pole power factor correction circuit 111 is less than $V_0$, the control circuit 1112 does not send the third control signal $G_{QL}$ to the third switch $Q_L$, and does not send the fourth control signal $G_{QH}$ to the fourth switch $Q_H$, and the third switch $Q_L$ and the fourth switch $Q_H$ are turned off.

At a moment $t_6$, the voltage value of the input voltage $V_{in}$ received by the totem-pole power factor correction circuit 111 decreases from 0. The control circuit 1112 sends the second control signal $G_{SH}$ to the second switch $S_H$, so that the second switch $S_L$ is turned on based on the second control signal $G_{SH}$. In addition, the first switch $S_L$ is turned off. After the moment $t_6$ and before a moment $t_{11}$, the voltage value of the input voltage $V_{in}$ remains negative, and the control circuit 1112 continuously sends the second control signal $G_{SH}$ to the second switch $S_H$, so that the second switch $S_H$ remains on, and the first switch $S_L$ remains off. Between the moment $t_6$ and the moment $t_{11}$, the fourth switch $Q_H$ configured to charge the inductor L is denoted as the main power switch, and the third switch $Q_L$ configured to discharge the inductor L is denoted as the auxiliary power switch.

After the moment $t_6$ and before a moment $t_7$, the voltage value of the input voltage $V_{in}$ received by the totem-pole power factor correction circuit 111 is less than $V_0$, the control circuit 1112 does not send the third control signal $G_{QL}$ to the third switch $Q_L$, and does not send the fourth control signal $G_{QH}$ to the fourth switch $Q_H$, and the third switch $Q_L$ and the fourth switch $Q_H$ are turned off.

After the moment $t_7$ and before a moment $t_8$, the absolute value of the voltage value of the input voltage $V_{in}$ is greater than $V_0$ and less than the predetermined voltage value $V_Y$, but the phase value of the input voltage $V_{in}$ is not within the predetermined phase range. The control circuit 1112 controls the third switch $Q_L$ to be alternately turned on and off, and controls the fourth switch $Q_H$ to be turned off.

Figure 7:
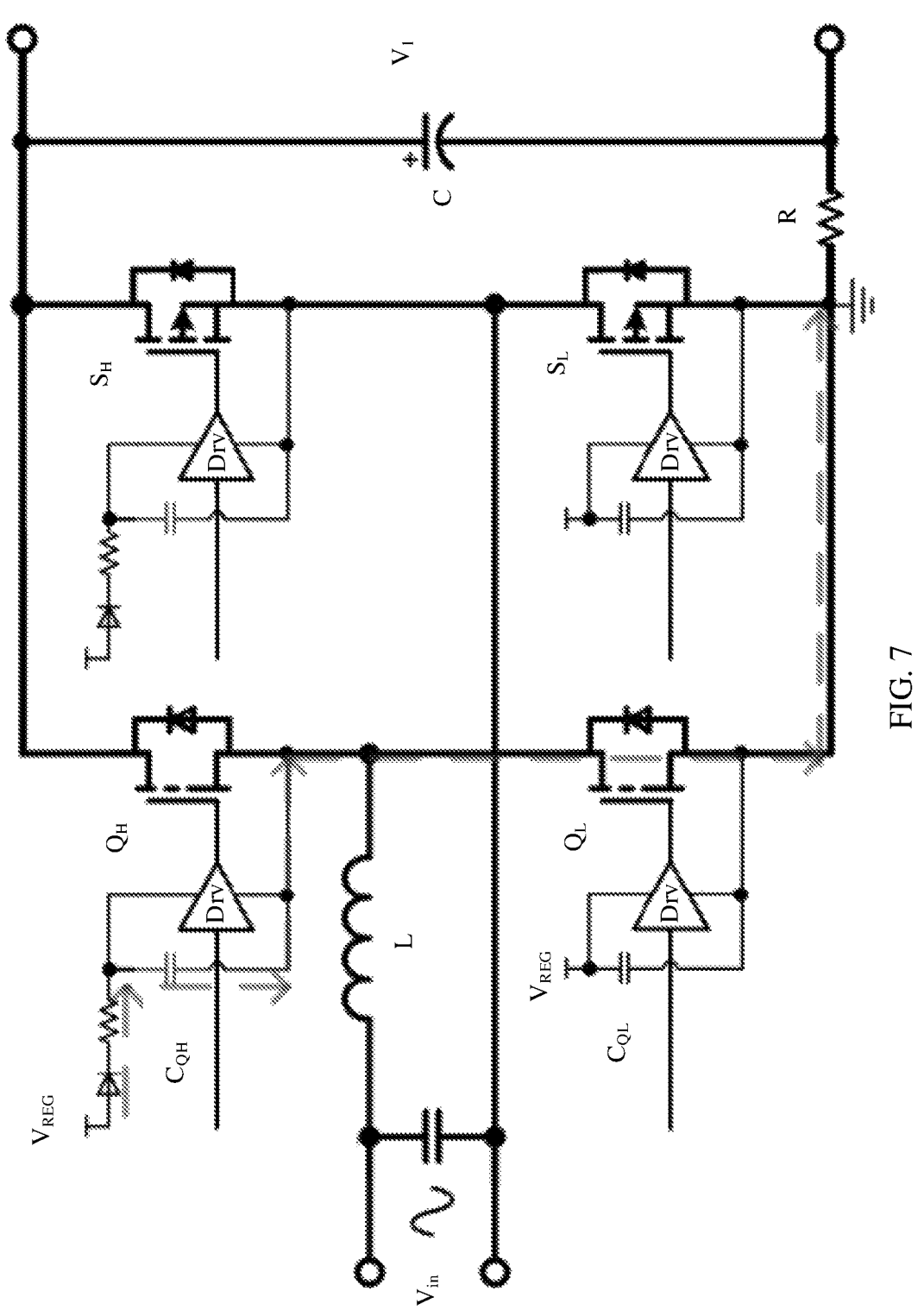
FIG. 7 is a schematic diagram of another circuit structure of a totem-pole power factor correction circuit according to an embodiment.

Between the moment $t_7$ and the moment $t_8$, although the absolute value of the voltage value of the input voltage $V_{in}$ is less than the predetermined voltage value $V_Y$, when the phase value of the input voltage $V_{in}$ is between 180 degrees and 270 degrees, the fourth switch $Q_H$ is the main power switch, and the third switch $Q_L$ is the auxiliary power switch. FIG. 7 is a schematic diagram of another circuit structure of the totem-pole power factor correction circuit according to the embodiments. FIG. 7 shows a bootstrap capacitor of each power switch and a connection relationship. To charge a bootstrap capacitor $C_{QH}$ of the fourth switch $Q_H$, the third switch $Q_L$ needs to be turned on, so that a charging voltage $V_{REG}$ can be grounded through the bootstrap capacitor $C_{QH}$ and a drain and a source of the third switch $Q_L$. Between the moment $t_7$ and the moment $t_8$, if the control circuit 1112 controls only the fourth switch $Q_H$ to be turned on and controls the third switch $Q_L$ to be turned off, the fourth switch $Q_H$ cannot perform bootstrap charging, and as a result, the entire totem-pole power factor correction circuit 111 cannot normally provide the output voltage $V_1$. Therefore, between the moment $t_7$ and the moment $t_8$, the control circuit 1112 controls the third switch $Q_L$ and the fourth switch $Q_H$ to be alternately turned on.

After the moment $t_8$ and before a moment $t_9$, in response to a case in which the absolute value of the voltage value of the input voltage $V_{in}$ is greater than the predetermined voltage value $V_Y$, and the phase value of the input voltage $V_{in}$ is not within the predetermined phase range, the control circuit 1112 periodically sends the third control signal $G_{QL}$ to the third switch $Q_L$, and sends the fourth control signal $G_{QH}$ to the fourth switch $Q_H$, so that the third switch $Q_L$ and the fourth switch $Q_H$ are alternately turned on.

In an embodiment, between the moment $t_7$ and the moment $t_9$, in response to a case in which the absolute value of the voltage value of the input voltage $V_{in}$ is greater than $V_0$ and less than the predetermined voltage value $V_Y$, and the phase value of the input voltage $V_{in}$ is not within the predetermined phase range, the control circuit 1112 periodically sends the third control signal $G_{QL}$ to the third switch $Q_L$, and sends the fourth control signal $G_{QH}$ to the fourth switch $Q_H$, so that the third switch $Q_L$ and the fourth switch $Q_H$ are alternately turned on. Duration in which the control circuit 1112 sends the fourth control signal $G_{QH}$ each time to the fourth switch $Q_H$, the main power switch, is the first preset duration $T_1$, and duration of each on-session of the fourth switch $Q_H$ is the first preset duration $T_1$. Duration in which the control circuit 1112 sends the third control signal $G_{QL}$ each time to the third switch $Q_L$, the auxiliary power switch, is the second preset duration $T_2$, and duration of each on-session of the third switch $Q_L$ is the second preset duration $T_2$.

Between the moment $t_7$ and the moment $t_9$, when the fourth switch $Q_H$ is turned on, and the third switch $Q_L$ is turned off, the input voltage $V_{in}$ charges the inductor L through the fourth switch $Q_H$ and the second switch $S_H$ and the current $i_L$ flowing through the inductor L gradually increases. When the third switch $Q_L$ is turned off, and the fourth switch $Q_H$ is turned off, for example, the third switch $Q_L$ is a MOS transistor, the inductor L is discharged through a body diode $D_{QL}$ of the third switch $Q_L$, the output end b and the output end a of the totem-pole power factor correction circuit 111, and the second switch $S_H$, to provide the output voltage $V_1$ for the direct current conversion circuit 112. When the fourth switch $Q_H$ is turned off, and the third switch $Q_L$ is turned on, the inductor L is discharged through the source and the drain of the third switch $Q_L$, the output end b and the output end a of the totem-pole power factor correction circuit 111, and the second switch $S_H$, to provide the output voltage $V_1$ for the direct current conversion circuit 112.

After the moment $t_9$ and before a moment $t_{10}$, the voltage value of the input voltage $V_{in}$ received by the totem-pole power factor correction circuit 111 is greater than $V_0$ and less than the predetermined voltage value $V_Y$, and the control circuit 1112 controls the fourth switch $Q_H$ to be alternately turned on and off, and controls the third switch $Q_L$ to be turned off.

In an embodiment, between the moment $t_9$ and the moment $t_{10}$, in response to a case in which the absolute value of the voltage value of the input voltage $V_{in}$ is greater than $V_0$ and less than the predetermined voltage value $V_Y$, and the phase value of the input voltage $V_{in}$ is within the predetermined phase range, the control circuit 1112 periodically sends the fourth control signal $G_{QH}$ to the fourth switch $Q_H$, for the first preset duration $T_1$ each time, so that the fourth switch $Q_H$ is periodically turned on based on the fourth control signal $G_{QH}$. In addition, the control circuit 1112 does not send the third control signal $G_{QL}$ to the third switch $Q_L$, so that the third switch $Q_L$ is turned off.

In an embodiment, between the moment $t_9$ and the moment $t_{10}$, when the fourth switch $Q_H$ is turned on, and the third switch $Q_L$ is turned off, the input voltage $V_{in}$ charges the inductor L through the fourth switch $Q_H$ and the second switch $S_H$, and the current $i_L$ flowing through the inductor L gradually increases. When the third switch $Q_L$ is turned off, and the fourth switch $Q_H$ is turned off, for example, the third switch $Q_L$ is a MOS transistor, the inductor L is discharged through a body diode $D_{QL}$ of the third switch $Q_L$, the output end b and the output end a of the totem-pole power factor correction circuit 111, and the second switch $S_H$, to provide the output voltage $V_1$ for the direct current conversion circuit 112.

Thus, in response to a case in which a phase value of a transient voltage of the input voltage $V_{in}$ of the current totem-pole power factor correction circuit 111 is within the predetermined phase range, and the absolute value of the voltage value is less than the predetermined voltage value, the control circuit 1112 of the totem-pole power factor correction circuit 111 can control the main power switch in the half-bridge circuit 1111b to be turned on and off, and control the auxiliary power switch to remain off. Refer to the control logic in FIG. 6 in this embodiment. In this embodiment, when a voltage value of the transient voltage of the input voltage $V_{in}$ is small between the moment $t_2$ and the moment $t_3$, the moment $t_4$ and the moment $t_5$, and the moment $t_9$ and the moment $t_{10}$, the control circuit 1112 controls the auxiliary power switch to remain off.

Therefore, when the voltage value of the input voltage $V_{in}$ is small, energy provided by the input voltage $V_{in}$ for the inductor L is low, and the control circuit 1112 can control the auxiliary power switch to remain off. This avoids "hard turn-on" of the auxiliary power switch in a case of different voltages at both sides of the auxiliary power switch when the inductor L cannot resonate a voltage value at one side of the auxiliary power switch to a large voltage value. Therefore, according to this embodiment, a switching loss of the auxiliary power switch in the totem-pole power factor correction circuit 111 can be reduced, and operating efficiency of the totem-pole power factor correction circuit 111 and the power module 11 including the totem-pole power factor correction circuit 111 can be improved. In addition, a structure of an existing totem-pole power factor correction circuit 111 is not improved, and effects of a simple circuit structure and low costs are further achieved.

In addition, it should be noted that between the moment $t_2$ and the moment $t_3$, the moment $t_4$ and the moment $t_5$, and the moment $t_9$ and the moment $t_{10}$, the control circuit 1112 controls the auxiliary power switch to remain off, but the inductor L can still be discharged through the body diode of the auxiliary power switch, to provide the output voltage $V_1$ for the direct current conversion circuit 112. Therefore, in this embodiment, control performed by the control circuit 1112 on the half-bridge circuit 1111b has little impact on the output voltage $V_1$ of the totem-pole power factor correction circuit 111. This ensures normal operation of the totem-pole power factor correction circuit 111 and the power module 11 including the totem-pole power factor correction circuit 111.

Figure 8:
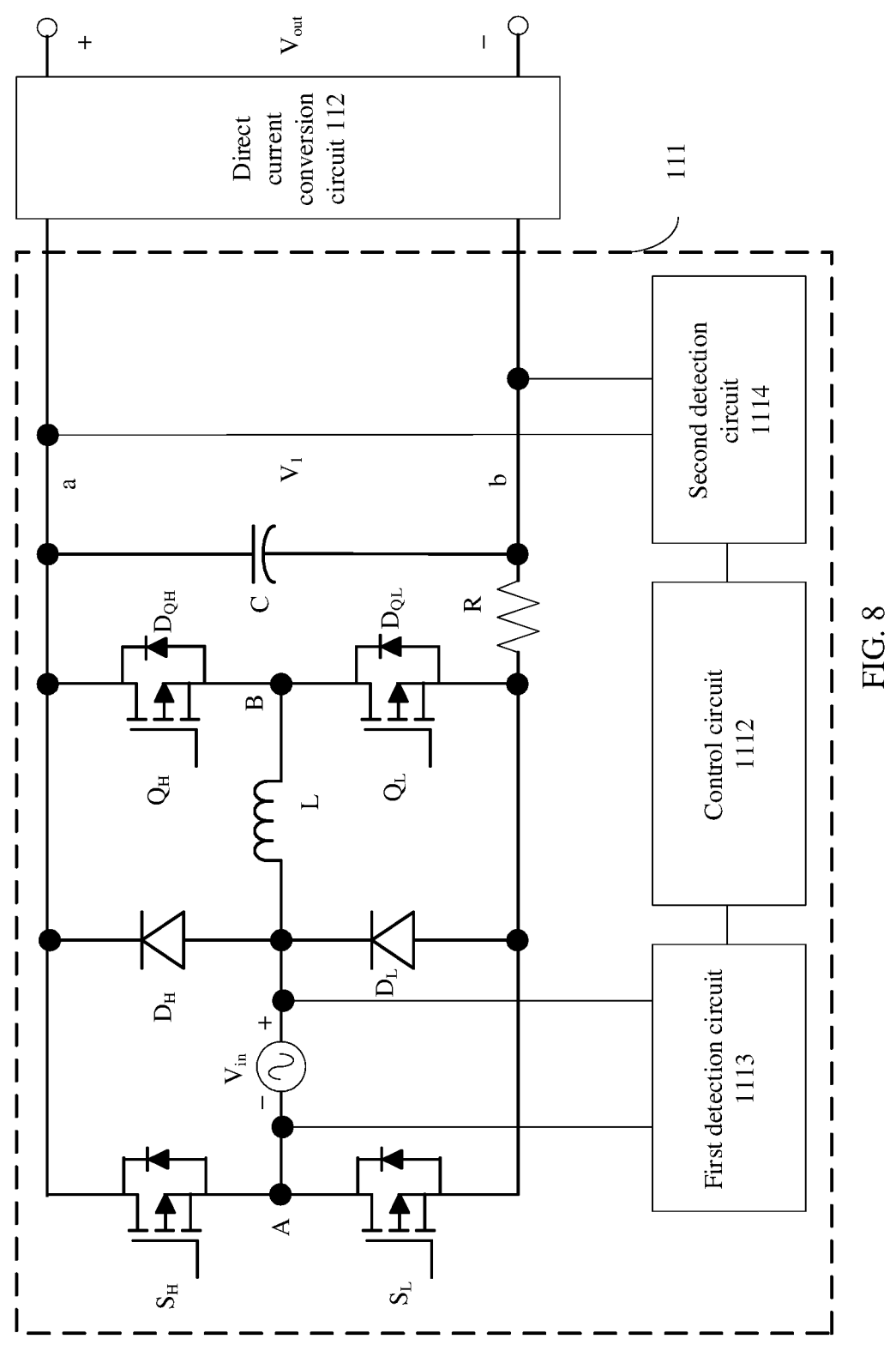
FIG. 8 is a schematic diagram of a structure of a power module according to an embodiment.

FIG. 8 is a schematic diagram of a structure of a power module according to an embodiment. Based on the power module shown FIG. 4, the power module shown in FIG. 8 further includes a first detection circuit 1113 and a second detection circuit 1114. The control circuit 1112 may be configured to detect a voltage value, a phase value, and the like of the input voltage $V_{in}$ of the totem-pole power factor correction circuit 111 through the first detection circuit 1113, so that the control circuit 1112 controls the half-bridge circuit 1111b based on the voltage value and the phase value of the input voltage $V_{in}$. The control circuit 1112 may be configured to detect a voltage value and the like of the output voltage $V_1$ of the totem-pole power factor correction circuit 111 through the second detection circuit 1114, so that the control circuit 1112 determines a predetermined voltage value and the like based on the voltage value of the output voltage $V_1$. Specific circuit structures of the first detection circuit 1113 and the second detection circuit 1114 are not limited. For example, the first detection circuit may include a plurality of voltage divider resistors connected in series. In this case, the control circuit 1112 may determine the voltage value and the like of the input voltage $V_{in}$ by detecting a voltage value on the voltage divider resistor.

Figure 9:
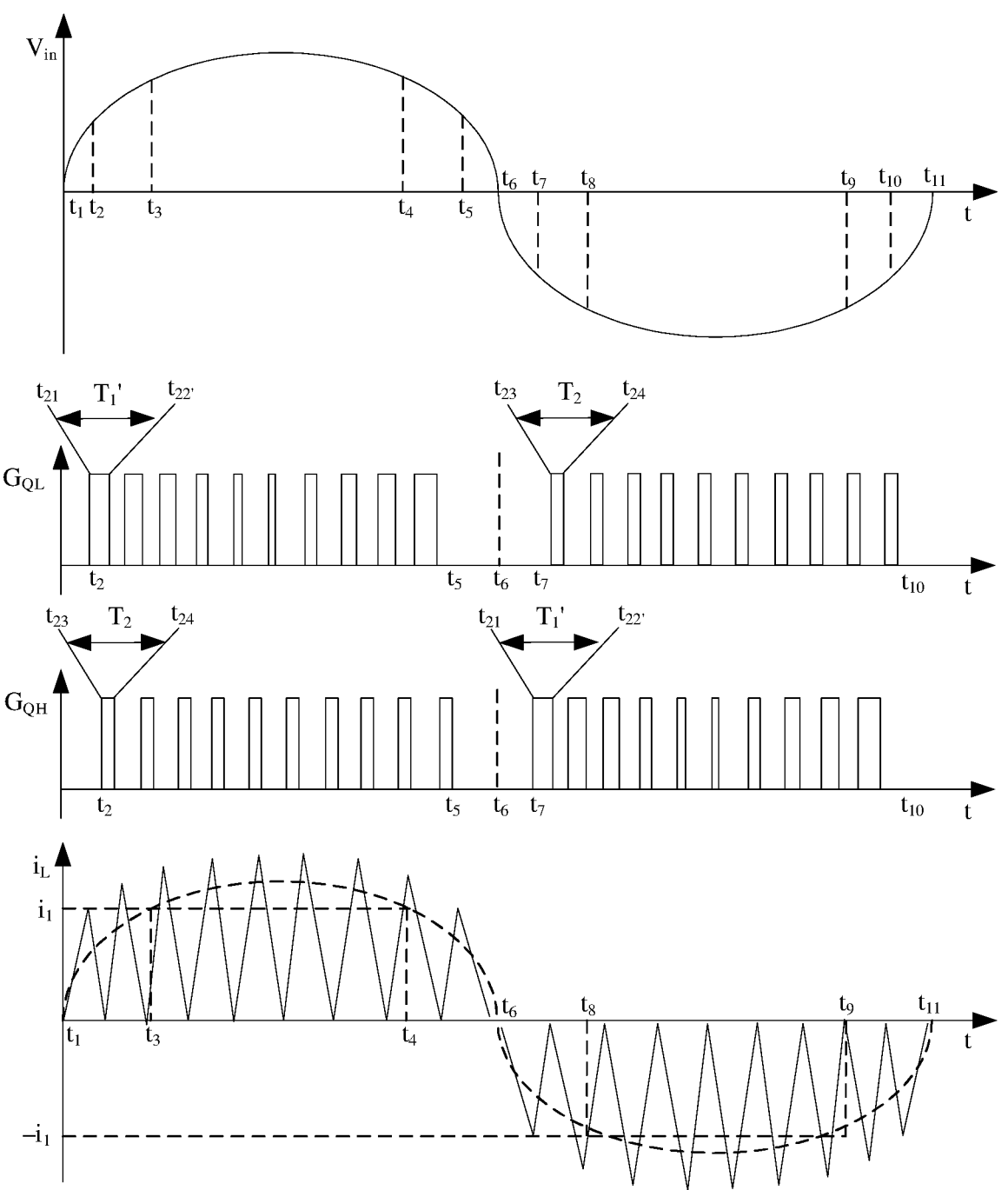
FIG. 9 is a schematic diagram of a control logic of a control circuit of a totem-pole power factor correction circuit according to an embodiment.

FIG. 9 is a schematic diagram of a control logic of a control circuit of a totem-pole power factor correction circuit according to an embodiments. The control logic shown in FIG. 9 may be applied to the power module 11 shown in FIG. 4, and is used by the control circuit 1112 of the totem-pole power factor correction circuit 111 to control the half-bridge circuit 1111b. The following describes, with reference to the totem-pole power factor correction circuit 111 provided in FIG. 4, the control logic in FIG. 9 provided in an embodiment.

As shown in FIG. 9, the control circuit 1112 outputs a control signal to a main power switch and an auxiliary power switch in the totem-pole power factor correction circuit 111 based on a voltage value of the input voltage $V_{in}$, to control the main power switch and the auxiliary power switch to be alternately turned on and off. A moment at which the control circuit 1112 sends the control signal to the main power switch and the auxiliary power switch in the totem-pole power factor correction circuit 111 is the same as that shown in FIG. 5, and details are not described again.

In the embodiment shown in FIG. 9, each time before sending the control signal to the main power switch, the control circuit 1112 adjusts, based on the voltage value of the current input voltage $V_{in}$, duration of sending the control signal to the main power switch, so that the duration of the control signal is negatively correlated with an absolute value of the voltage value of the input voltage $V_{in}$, and duration of each on-session of the main power switch is negatively correlated with the voltage value of the input voltage $V_{in}$.

In an embodiment, the control circuit 1112 may obtain multiply first preset duration $T_1$ of each on-session of the main power switch by a multiple n to obtain adjusted duration of the control signal. n is a constant that is negatively correlated to the absolute value of the voltage value of the input voltage $V_{in}$. For example, as shown in FIG. 9, between a moment $t_1$ and a moment $t_6$, the third switch $Q_L$ is the main power switch. In this case, before sending the third control signal $G_{QL}$ to the third switch $Q_L$ at a moment $t_{21}$ between a moment $t_2$ and a moment $t_5$, the control circuit 1112 multiplies the first preset duration $T_1$ by the multiple n, to obtain adjusted duration $T_1'$. Subsequently, the control circuit 1112 sends the third control signal $G_{QL}$ to the third switch $Q_L$ for $T_1'$, so that on-duration of the third switch $Q_L$ is $T_1'$. Between the moment $t_2$ and the moment $t_5$, the control circuit 1112 does not adjust duration in which the control circuit 1112 sends the fourth control signal $G_{QH}$ to the fourth switch $Q_H$, and keeps the duration to be second preset duration $T_2$. Correspondingly, between the moment $t_6$ and the moment $t_{11}$, the fourth switch $Q_H$ is the main power switch. In this case, the control circuit 1112 sends the fourth control signal $G_{QH}$ to the fourth switch $Q_H$ for $T_1'$, and sends the third control signal $G_{QL}$ to the third switch $Q_L$ for the second preset duration $T_2$.

Because n is negatively correlated with the voltage value of the input voltage $V_{in}$, in an entire cycle of the input voltage $V_{in}$ between the moment $t_1$ and the moment $t_{11}$, on-duration of the main power switch is negatively correlated with the voltage value of the input voltage $V_{in}$.

Therefore, when the input voltage $V_{in}$ is low, the on-duration of the main power switch is long. This increases duration for charging the inductor L by using the input voltage $V_{in}$, thereby increasing energy after the inductor L is charged. When the input voltage $V_{in}$ is high, the on-duration of the main power switch is short, and overall energy balance can be maintained. Therefore, impact of a change of the on-duration of the main power switch on power of the output voltage $V_1$ of the totem-pole power factor correction circuit 111 is reduced.

Even if the voltage value of the input voltage $V_{in}$ is small, the energy provided by the input voltage $V_{in}$ for the inductor L may also be increased. In this way, between the moment $t_2$ and a moment $t_3$, a moment $t_4$ and the moment $t_5$, and a moment $t_9$ and a moment $t_{10}$, a voltage value provided by the inductor L to one side of the auxiliary power switch is increased, which can avoid "hard turn-on" of the auxiliary power switch in a case of different voltages at both sides of the auxiliary power switch within these time periods. Therefore, according to this embodiment, a switching loss of the auxiliary power switch in the totem-pole power factor correction circuit 111 can be reduced, and operating efficiency of the totem-pole power factor correction circuit 111 and the power module 11 including the totem-pole power factor correction circuit 111 can be improved. In addition, a structure of an existing totem-pole power factor correction circuit 111 is not improved, and effects of a simple circuit structure and low costs are further achieved.

The embodiments further provide an electronic device, including the control circuit 1112 provided in any embodiment, or the power module 11 provided in any embodiment.

In the foregoing embodiment, a method performed by the control circuit 1112 provided in this embodiment is described. To implement the functions in the method provided in the foregoing embodiments, the control circuit 1112 that is used as an execution body may include a hardware structure and/or a software module, and implement the functions in a form of the hardware structure, the software module, or a combination of the hardware structure and the software module. Whether a specific function in the foregoing functions is performed by using the hardware structure, the software module, or the combination of the hardware structure and the software module depends on a specific application and a design constraint of the solutions. It should be noted and understood that division of the modules of a foregoing apparatus is merely logic function division. In actual implementation, some or all modules may be integrated into one physical entity, or the modules may be physically separated. The modules may be all implemented in a form of software invoked by a processing element, or may be all implemented in a form of hardware. Alternatively, some modules may be implemented in a form of software invoked by a processing element, and some modules are implemented in a form of hardware. The module may be a processing element separately disposed, or may be integrated in a chip of the foregoing apparatus for implementation. In addition, the module may alternatively be stored in a memory of the foregoing apparatus in a form of program code, and is invoked by a processing element of the foregoing apparatus to perform a function of a foregoing determining module. The other modules are implemented in a similar manner. In addition, all or some of the modules may be integrated together, or may be implemented independently. The processing element herein may be an integrated circuit, and has a signal processing capability. In an implementation process, steps in the method or the modules may be implemented by using a hardware integrated logical circuit in the processing element, or by using instructions in a form of software. For example, the foregoing modules may be one or more integrated circuits configured to implement the foregoing method, for example, one or more application-specific integrated circuits (ASICs), one or more digital signal processors (DSPs), or one or more field programmable gate arrays (FPGAs). For another example, when one of the foregoing modules is implemented in a form of invoking program code by a processing element, the processing element may be a general-purpose processor, for example, a central processing unit (CPU) or another processor capable of invoking the program code. For another example, the modules may be integrated together and implemented in a form of a system-on-a-chip (SOC).

In the foregoing embodiment, all or some steps performed by the control circuit 1112 may be implemented by using software, hardware, firmware, or any combination thereof. When software is used to implement embodiments, all or some embodiments may be implemented in a form of a computer program product. The computer program product includes one or more computer instructions. When the computer program instructions are loaded and executed on a computer, the procedures or functions according to embodiments are all or partially generated. The computer may be a general-purpose computer, a dedicated computer, a computer network, or another programmable apparatus. The computer instructions may be stored in a non-transitory computer-readable storage medium, or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The non-transitory computer-readable storage medium may be any usable medium accessible to a computer, or a data storage device, for example, a server or a data center, integrating one or more usable media. The usable medium may be a magnetic medium (for example, a floppy disk, a hard disk, or a magnetic tape), an optical medium (for example, a DVD), a semiconductor medium (for example, a solid-state disk (SSD)), or the like.

The embodiments further provide a non-transitory computer-readable storage medium. The non-transitory computer-readable storage medium stores computer instructions. The computer instructions, when executed, may be used to perform any method performed by the control circuit 1112 in the foregoing embodiments.

An embodiment further provides a chip for running instructions. The chip is configured to perform any method performed by the control circuit 1112 in the embodiments.

An embodiment further provides a computer program product. The program product includes a computer program. The computer program is stored in a storage medium. At least one processor may read the computer program from the storage medium. When executing the computer program, the at least one processor may implement any method performed by the control circuit 1112 in the embodiments.

A person of ordinary skill in the art may understand that all or some of the steps in the foregoing embodiments may be implemented by a program instructing related hardware. The program may be stored in a computer-readable storage medium. When the program is executed, the steps of each method embodiment are performed. The foregoing storage medium includes any medium capable of storing program code, for example, a ROM, a magnetic disk, or an optical disc.

A person of ordinary skill in the art may understand that embodiments are separately described by using functional modules, to facilitate description of the solutions of the embodiments. Circuit components in the modules may partially or completely overlap, and this is not intended to limit the scope of the embodiments.

Further, it should be noted that the foregoing embodiments are merely intended for describing solutions and not for limiting. Although described in detail with reference to the foregoing embodiments, a person of ordinary skill in the art should understand that they may still make modifications to the solutions described in the foregoing embodiments or make equivalent replacements to some or all features thereof, without departing from the scope of the solutions of the embodiments.

What is claimed is:

1. A totem-pole power factor correction circuit, comprising:

a half-bridge circuit and a control circuit, wherein the half-bridge circuit comprises a main power switch and an auxiliary power switch;

the totem-pole power factor correction circuit is configured to receive an input voltage, and provide an output voltage;

the control circuit is configured to output a control signal to the half-bridge circuit; and wherein:

when a phase value of the input voltage is within a predetermined phase range, and an absolute value of a voltage value of the input voltage is less than a predetermined voltage value, the main power switch is turned on and off based on the control signal, and the auxiliary power switch remains off based on the control signal, wherein the predetermined phase range is 0 degrees to 180 degrees and 270 degrees to 360 degrees, and the predetermined voltage value is k times a peak voltage of the output voltage, with k being greater than 0 and less than 1;

when the phase value of the input voltage is not within the predetermined phase range, the main power switch and the auxiliary power switch are alternately turned on and off based on the control signal; and when the absolute value of the voltage value of the input voltage is greater than or equal to the predetermined voltage value, the main power switch and the auxiliary power switch are alternately turned on and off based on the control signal.

2. The totem-pole power factor correction circuit according to claim 1, wherein the main power switch and the auxiliary power switch are alternately turned on and off based on the control signal; and a duration of each on-session of the main power switch is negatively correlated with an absolute value of a voltage value of the input voltage, wherein the duration of each on-session of the main power switch is n times a preset duration of each on-session of the main power switch, and n is negatively correlated with the absolute value of the voltage value of the input voltage.

3. A power module, configured to obtain an input voltage, and supply power to a load, the power module comprising:

a totem-pole power factor correction circuit configured to obtain the input voltage and provide an output voltage; and a direct current conversion circuit configured to perform voltage conversion on the output voltage and then supply power to the load; and the totem-pole power factor correction circuit comprises a half-bridge circuit and a control circuit, the half-bridge circuit comprises a main power switch and an auxiliary power switch;

the control circuit is configured to output a control signal to the half-bridge circuit; and wherein:

when a phase value of the input voltage is within a predetermined phase range, and an absolute value of a voltage value of the input voltage is less than a predetermined voltage value, the main power switch is turned on and off based on the control signal, and the auxiliary power switch remains off based on the control signal, wherein the predetermined phase range is 0 degrees to 180 degrees and 270 degrees to 360 degrees, and the predetermined voltage value is k times a peak voltage of the output voltage, with k being greater than 0 and less than 1, when the phase value of the input voltage is not within the predetermined phase range, the main power switch and the auxiliary power switch are alternately turned on and off based on the control signal, and when the absolute value of the voltage value of the input voltage is greater than or equal to the predetermined voltage value, the main power switch and the auxiliary power switch are alternately turned on and off based on the control signal.

4. The power module according to claim 3, wherein the main power switch and the auxiliary power switch are alternately turned on and off based on the control signal; and a duration of each on-session of the main power switch is negatively correlated with an absolute value of a voltage value of the input voltage, wherein the duration of each on-session of the main power switch is n times a preset duration of each on-session of the main power switch, and n is negatively correlated with the absolute value of the voltage value of the input voltage.

* * * * *